Aug. 19, 1930.  R. C. LEWIS  1,773,428
MACHINE FOR MIXING RUBBER OR LIKE MATERIAL
Filed May 17, 1926  5 Sheets-Sheet 1
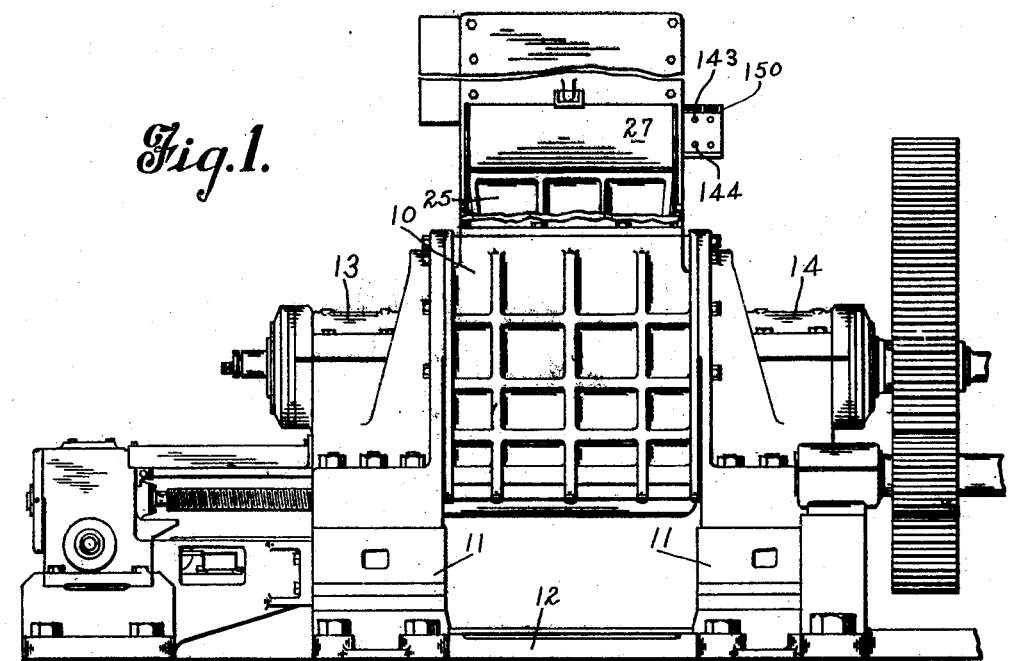
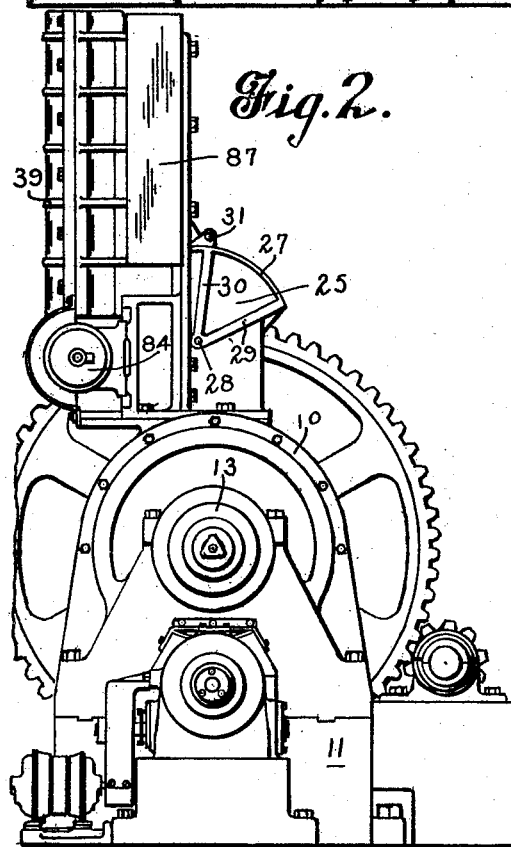
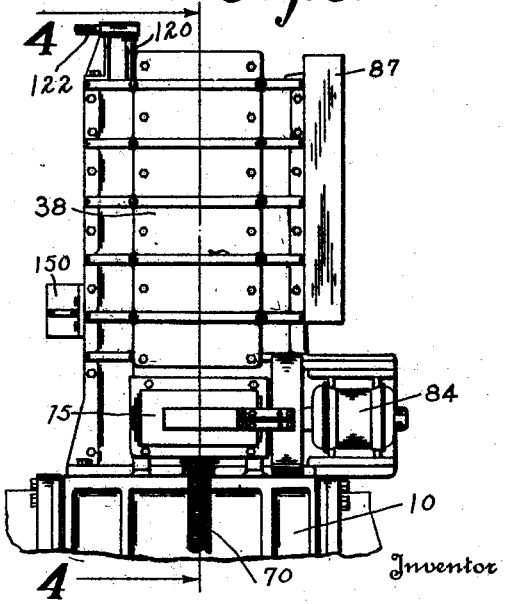
Inventor
Richard C. Lewis
By Henry E. Rockwell
Attorney

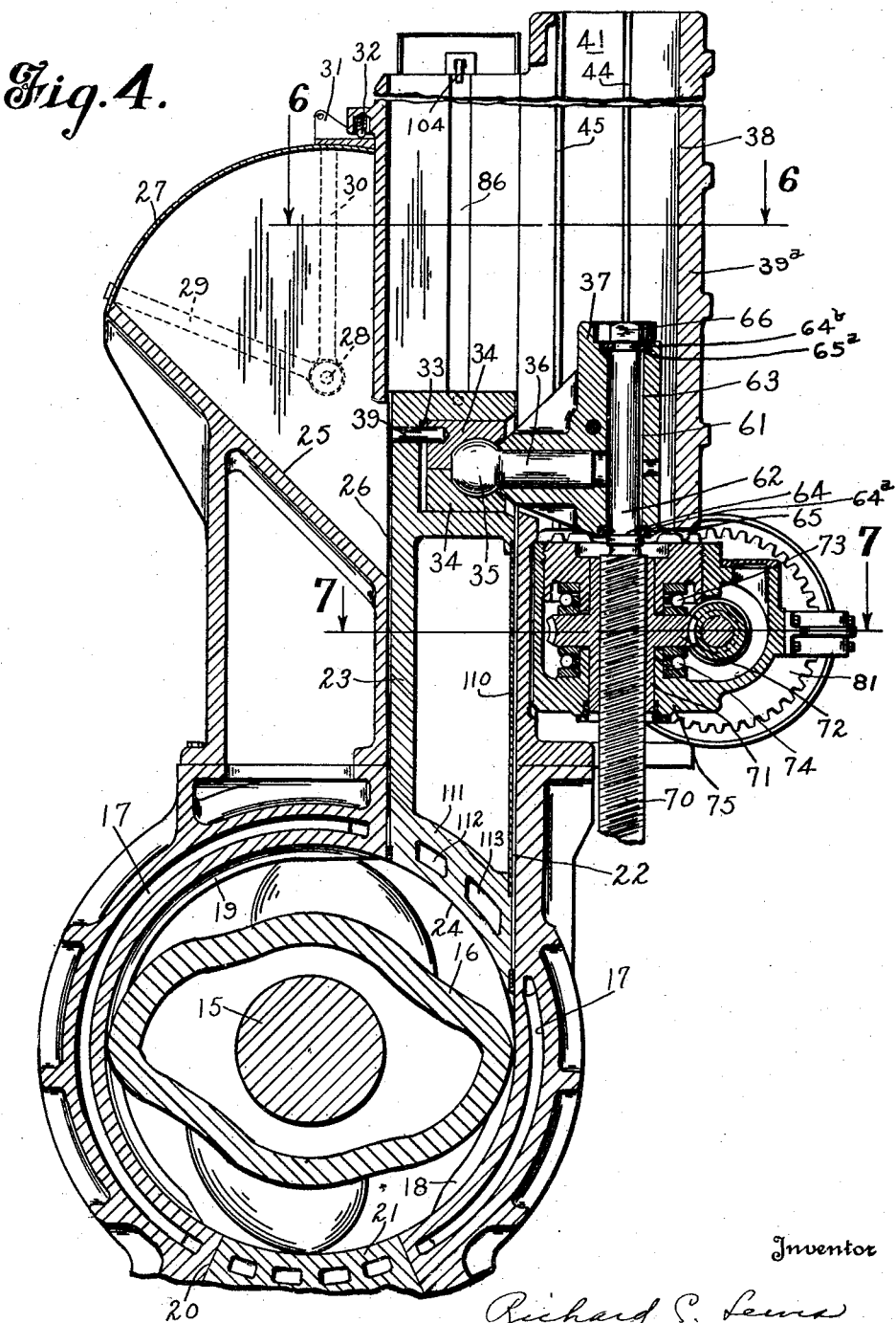

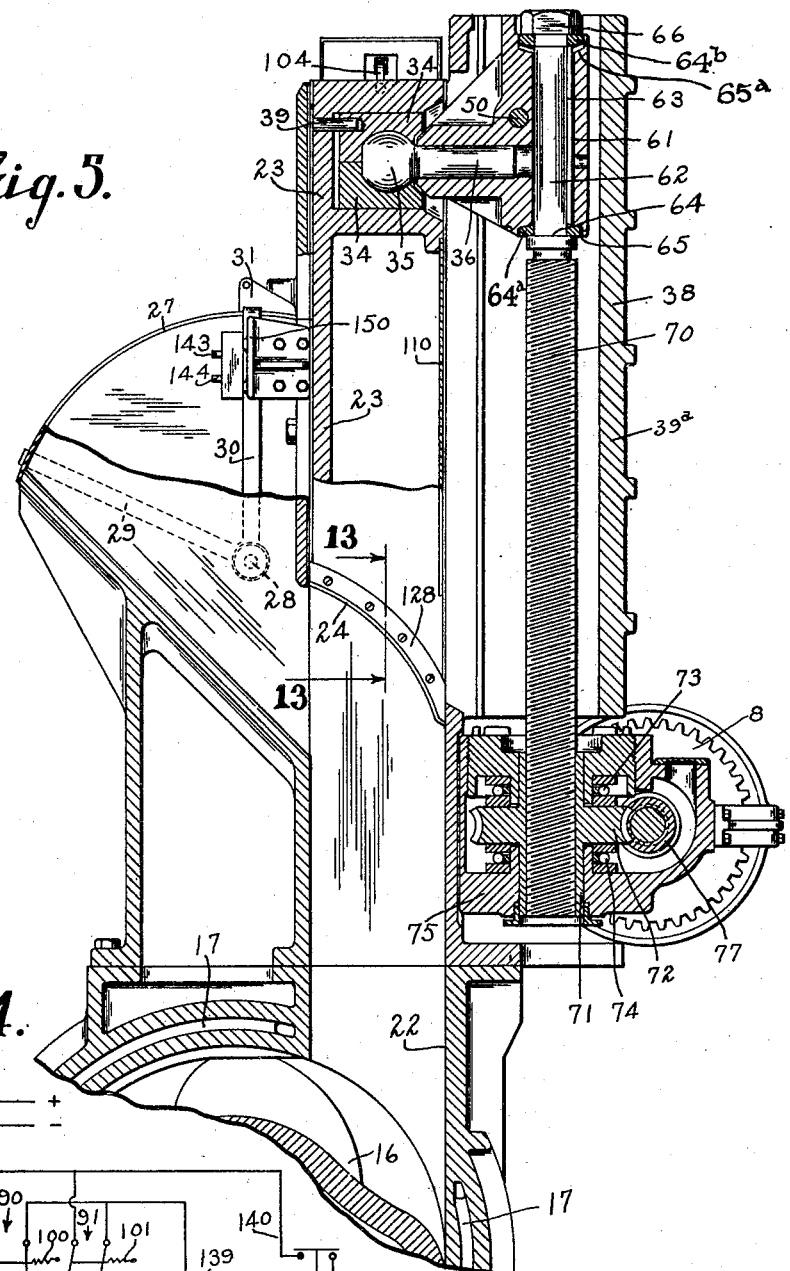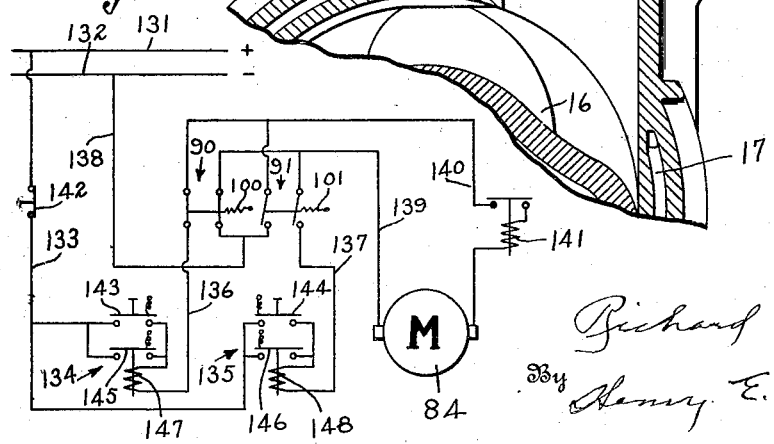

Aug. 19, 1930.    R. C. LEWIS    1,773,428
MACHINE FOR MIXING RUBBER OR LIKE MATERIAL
Filed May 17, 1926    5 Sheets-Sheet 4

Inventor
Richard C. Lewis
By Henry E. Rockwell
Attorney

Aug. 19, 1930.   R. C. LEWIS   1,773,428
MACHINE FOR MIXING RUBBER OR LIKE MATERIAL
Filed May 17, 1926   5 Sheets-Sheet 5
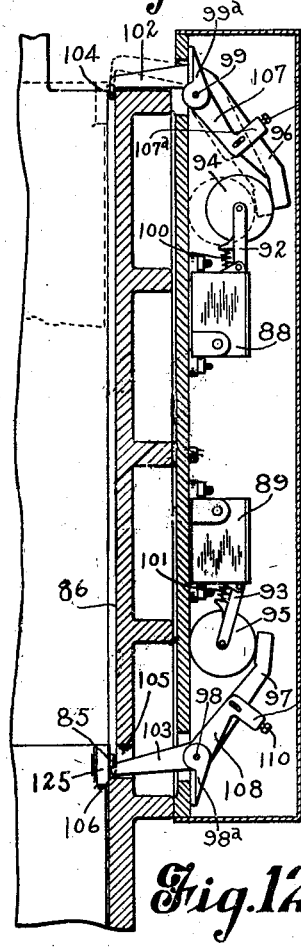
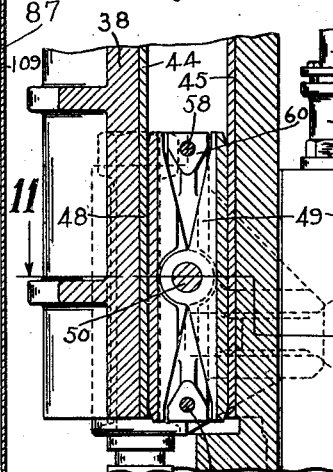
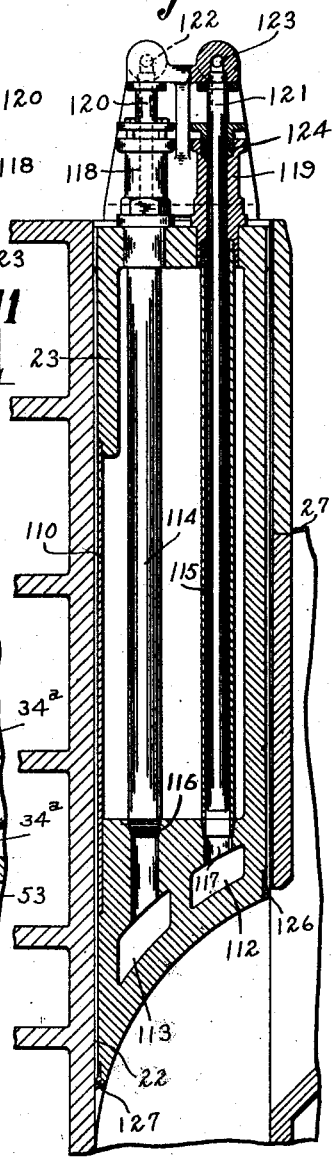
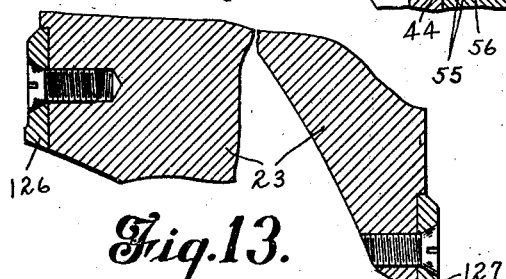
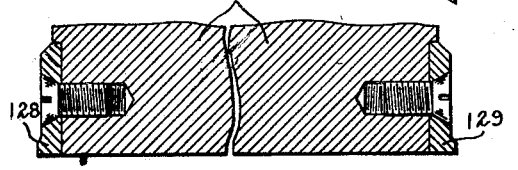
Inventor
Richard C. Lewis
By Henry E. Rockwell
Attorney Patented Aug. 19, 1930

1,773,428

UNITED STATES PATENT OFFICE

RICHARD C. LEWIS, OF ANSONIA, CONNECTICUT, ASSIGNOR, BY MESNE ASSIGNMENTS, TO FARREL-BIRMINGHAM COMPANY, INCORPORATED, OF ANSONIA, CONNECTICUT, A CORPORATION OF CONNECTICUT

MACHINE FOR MIXING RUBBER OR LIKE MATERIAL

Application filed May 17, 1926. Serial No. 109,651.

This invention relates to machines for treating rubber and similar material, and more especially to rubber mixing or masticating devices wherein is provided a mixing chamber within which the batch of material to be treated is introduced, and a rotor or rotors within the chamber to act upon the material so as to mix and knead it as required for the purpose for which the material is to be used.

In the device illustrated, the chamber is charged or the batch of material introduced through a stack or chute extending vertically upward from the upper portion of the chamber, and a plunger is reciprocably mounted within this feed stack so that it may be raised to a position to admit the charge, and then lowered to force the charge into the chamber and close the feed opening. As these machines are relatively large and heavy, it is desirable to provide for the raising and lowering of the plunger by power actuated mechanism which is capable of being so controlled that it may be reversed to move the plunger both to open and closed positions. It is also advantageous to have such actuating mechanism that the motion of the plunger may be checked when it reaches its lowermost and uppermost positions respectively, and it is quite advantageous that this be accomplished automatically without the necessity of careful attention on the part of the operator.

In some instances, the feed plunger of such machines has been operated by fluid pressure, and in such case, the installation of such a machine has required that the plant in which the installation is made, be equipped with compressed air or fluid pressure of some type, in order to operate the machine. As not all plants are equipped with such a source of power, I contemplate the provision of a rubber mixer wherein the plunger may be electrically operated so that no requirement is made upon the plant or factory within which the machine is installed except a source of electric current.

One object of my invention is the provision of a machine for treating rubber or similar materials, provided with a charging plunger adapted to be electrically operated.

A further object of my invention is the provision of a machine for treating rubber or similar materials, having a mixing chamber, a charging chute, and a charging plunger reciprocably mounted in the chute, and improved means for moving the plunger to open and closed positions.

A still further object of my invention is the provision of a rubber treating machine of the character described, having a reciprocable charging plunger, and improved electrically operated means for actuating the plunger.

A still further object of my invention is the provision of automatically actuated means for checking the movements of the plunger when the limits of its movement are reached in either direction.

Still another object of my invention is to provide in a rubber mixing machine of this character, various improvements in the charging plunger itself and in the parts associated therewith.

To these and other ends, the invention consists in the novel features and combination of parts to be hereinafter described and claimed.

In the accompanying drawings:

Fig. 1 is a front elevational view of a rubber treating machine, embodying my improvements;

Fig. 2 is a side view of the same;

Fig. 3 is a rear view of the upper portion of the machine, showing the charging stack;

Fig. 4 is a sectional view on line 4—4 of Fig. 3, showing the plunger in its lowermost or operating position;

Fig. 5 is a view similar to Fig. 4, showing the plunger in its raised or charging position;

Fig. 8 is a partial sectional view on line 8—8 of Fig. 6, showing the devices for automatically checking the movement of the plunger;

Fig. 9 is a sectional view through the plunger on line 9—9 of Fig. 6;

Fig. 10 is a sectional view on line 10—10 of Fig. 6;

Fig. 11 is a sectional view on line 11—11 of Fig. 10;

Fig. 12 is an enlarged fragmentary sectional view of the lower end of the plunger, showing the scrapers mounted thereon;

Fig. 13 is an enlarged fragmentary sectional view on line 13—13 of Fig. 5, showing the scrapers at the opposite ends of the plunger;

Fig. 14 is a diagrammatic view of the electrical connections by which the plunger movements are controlled.

Figure 6:
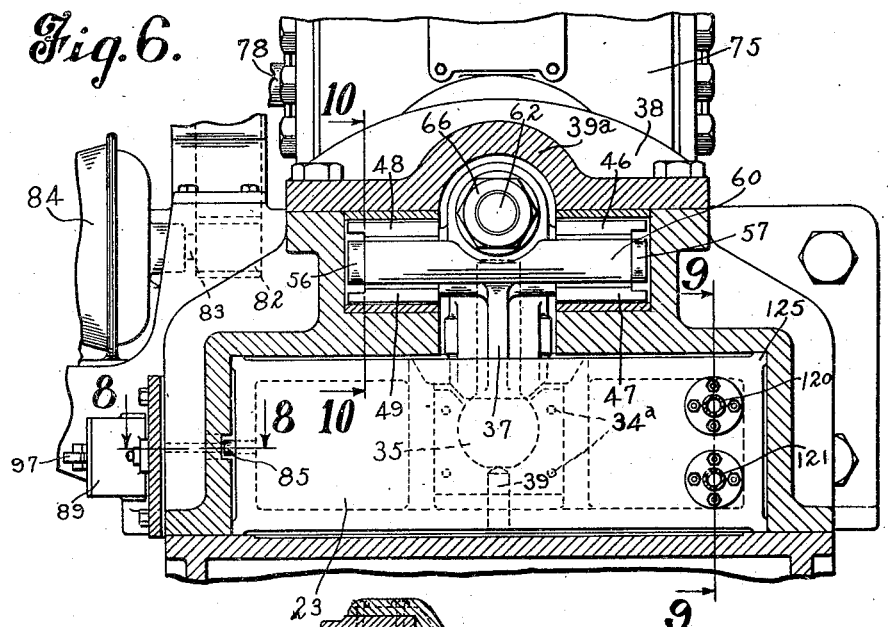
Fig. 6 is a transverse sectional view through the charging stack on line 6—6 of Fig. 4.
Figure 7:
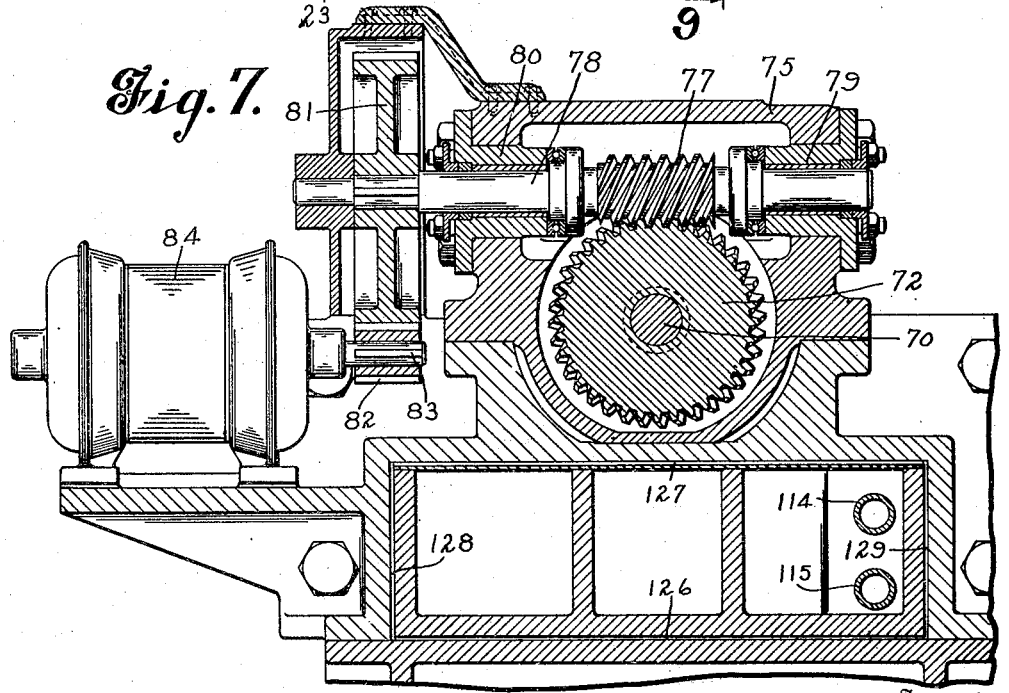
Fig. 7 is a sectional view through the electrically operated means for actuating the plunger, taken on line 7—7 of Fig. 4.

The rubber treating machine which I have selected to show and describe, as illustrated in the preferred embodiment of my invention, comprises a mixing chamber 10, mounted upon suitable standards 11, rising from a base 12. At each end of the chamber are bearing boxes 13 and 14 for the shaft 15 of the rotor 16, mounted within the chamber. In the form shown, the chamber is of substantially cylindrical shape, and is preferably surrounded at least partially by water jackets 17, so that the charge within the chamber may be kept at the proper temperature by the passage of a fluid therethrough. The rotor blades are arranged to work the material back and forth in the chamber, as is customary in machines of this character, and in its longitudinal passage through the chamber the charge is worked past extrusion ribs 18 and 19, provided upon the inner periphery of the chamber wall.

The chamber is provided with a discharge opening 20 at the bottom portion thereof, and a sliding door or closure member 21 cooperates with this opening to close the same during the operation of the machine, and to permit the discharge of the batch when the treatment thereof has been completed. The means for actuating the discharge door are described more particularly and claimed in my co-pending application, Serial No. 109,650, filed May 17, 1926, so that no further description of this feature of the device is necessary herein.

At the upper part of the chamber and adjacent the rear side thereof is arranged a charging chute or stack 22, occupying a position substantially tangential to the chamber itself. Within this chute or stack is mounted a reciprocable plunger 23, having a lower curved face 24, of substantially the same radius as the mixing chamber, so that when the plunger is in its lowermost position, as shown in Fig. 4, the lower face of the plunger will close the opening of the charging chute and form a continuation of the inner chamber surface so as to form a substantially complete cylinder.

Intermediate the ends of the charging chute is provided a hopper 25, communicating through the opening 26 with the chute, the hopper being closed by a cover 27 pivotally mounted at 28 upon the chute by means of the arms 29 and 30. A handle 31 is secured to the cover, and a spring pressed ball 32 is adapted to be received in a recess in this handle to yieldably hold the cover in position to close the hopper.

The plunger is provided adjacent its upper end with a cylindrical box or cavity 33, within which are mounted a pair of semi-cylindrical ball packing members 34 designed to embrace the spherical end 35 of a pin 36, secured to a cross-head 37. The semi-cylindrical packing members 34 are secured together by means of the pins 34ᵃ and are secured against rotation relatively to the plunger by the pin 39, and in these members are provided complemental hemispherical openings to receive the ball 35.

The connection between the cross-head and plunger is thus in the nature of a ball and socket joint so that flexibility of movement is allowed between these two elements. By this arrangement the plunger in its up and down movements will be permitted to assume the position of least resistance in the stack and any tendency of this member to bind will be obviated, which might otherwise occur if the plunger were connected rigidly to the cross-head.

The cross-head 37 is reciprocably mounted in a casing 38, disposed rearwardly of and parallel to the stack 22, and which communicates with the stack 22 so as to permit the end of the pin 36, which projects from the cross-head, to enter between the members 34 in the plunger.

The shape of the stack 38 in cross-section is shown more especially in Figs. 6 and 11, by reference to which it is seen that this casing is provided with an enlarged central portion 39 to accommodate the cross-head, and with guideways 40 and 41 upon each side of the central portion. These guideways are lined by the lining plates 42, 43, 44 and 45 against which bear the shoes 46, 47, 48 and 49, pivotally mounted upon the projecting ends of a pin 50, secured to the cross-head 37. These shoes are shown more particularly in Figs. 10 and 11, and are arranged in pairs upon the ends of the pin 50. The shoes 46 and 48 are provided with perforated flanges 52 and 53 to receive the pin 50, and which flanges are in turn received between the pairs of flanges 54 and 55, provided upon the shoes 47 and 49, respectively. These shoes also have long bearing surfaces extending in a vertical direction, which bear against the lining plates 42, 43, 44 and 45 so as to properly guide the cross-head in its reciprocating movements, and their pivotal connection with the pin 50 provides for a certain amount of relative motion between them and the cross-head so as to eliminate any tendency of the shoes to bind during their up and down movements.

Plates 56 and 57 are provided with openings at their central portions within which the ends of the pin 50 are received, and the upper and lower ends of these plates are secured by bolts or the like 58 and 59 to upper and lower cross-arms 60 on the cross-head 37.

The cross-head 37 is provided with a vertical bore 61 within which is secured with a certain amount of play, the upper end of a shaft 62, by means of the key 63. The shaft 62 is provided with a shoulder 64 abutting a washer 64$^a$ in a countersink 65 at the lower end of the bore 61, and a nut 66 at the upper end of the shaft abutting a washer 64$^b$ resting in a countersink 65$^a$ serves to secure these members in place. The arrangement of the washers is such as to permit a limited rotary movement of the cross-head relatively to the shaft so as to relieve the shaft from bending stresses.

The lower end of the shaft 62 is threaded, as shown at 70, and is received in an internally threaded sleeve 71, having integrally formed therewith a worm wheel 72, mounted in suitable ball bearings 73 and 74 in a bracket 75, secured to the frame of the machine below the casing 38. It will be apparent that as the shaft 62 is keyed to the cross-head 37 that it will be prevented from rotation within the sleeve 71, and that when this sleeve is rotated due to its threaded connection with the shaft 70 this shaft will be raised or lowered according to the direction of rotation of the sleeve, thereby raising or lowering the cross-head 37 and the plunger 23.

Meshing with the teeth of the worm wheel 72 is a worm 77, provided upon a shaft 78, mounted in suitable bearings 79 and 80 arranged in the casing 75. Upon one end of this shaft is a gear 81, the teeth of which mesh with a pinion 82, mounted upon the shaft 83, of an electric motor 84. The speed ratio between the worm 77 and worm wheel 72 will preferably be such that they will be self-locking so that no additional provision will be necessary to hold the plunger in its working position against the charge of material in the chamber.

It will be apparent that as the plunger moves from its upper position, shown in Fig. 5, to its lower or operating position, shown in Fig. 4, that the length of the threaded portion of the shaft 62 between the sleeve 71 and the cross-head, will be constantly decreasing, due to the fact that this shaft is mounted beside the plunger in parallel relation thereto so that these elements move downwardly together. For this reason when the plunger is adjacent its lower position, where it will probably meet the greatest resistance, there will be very little tendency for the threaded shaft to bend or break, due to the fact that its effective length will be small. In addition, the flexible connection of the cross-heads secured to the upper end of this shaft with the plunger, allows the plunger to adjust itself to the resistance encountered so that it will move more easily in the stack. In this manner any tendency of the threaded shaft to bend or break is substantially obviated.

The motor is so controlled that the current will be automatically cut off and the motor stopped when the plunger reaches the upper and lower limits of its movement. This is accomplished by means of the mechanism which will now be described.

As shown in Figs. 4 and 8, upon one side face of the plunger adjacent the upper end thereof is provided a pin 85 which projects into a groove 86, arranged in the side wall of the chute 22 and extending from the top of the stack down to the point opposite the upper end of the plunger when the latter is in its lowermost position. Mounted at one side of the stack 22 is a casing 87 within which are mounted switch boxes 88 and 89 containing the cut-out switches 90 and 91 respectively, shown diagrammatically in Fig. 14. These switches are operated respectively by pivoted arms 92 and 93, provided with rollers 94 and 95 at their ends, which rollers are adapted to be engaged by the links 96 and 97 pivoted at 98 and 99 to brackets 98$^a$ and 99$^a$ secured on the wall of the charging stack. Springs 100 and 101 normally hold arms 92 and 93 in position to maintain the switches closed so that current may be passed therethrough. The closed position of these arms is, as shown in connection with the switch boxes 88 in Fig. 8, a substantially vertical position with the roller and links 96 in their right-hand positions, as shown in full lines.

Also pivoted at 98 and 99 are bell crank levers having arms 102 and 103 projecting into the groove 86, the arm 102 projecting over the top of the wall of the charging chute and being provided with a finger 104 adapted to be engaged by the stop pin 85 when the plunger is moved to its uppermost position to throw the bell crank lever to its dotted line position, as shown in Fig. 8, and open the switch 90 in the switch box 88.

The arm 103 of the lower bell crank lever extends through an opening 105 in the casing so that its end 106 lies in the path of the pin 85 and is engaged by this pin, as shown in Fig. 8, to move the link 97 to the left and likewise the arm 93 in the same direction to break the switch 91 in the switch box 89. It will be apparent, therefore, that, as the switches 90 and 91 control the current operating the motor 84, this motor will be automatically stopped when the plunger reaches the upper or lower limits of its movement.

The other arms 107 and 108 of the bell crank levers are provided at their ends with stirrup members 107ª and 108ᵇ which embrace the links 96 and 97, and these stirrups are provided with adjusting screws 109 and 110 by which the relative positions of these links and the bell crank lever may be adjusted to regulate the throw of the levers necessary to effect the opening of the switches so that the latter action will take place at the proper time.

As shown more especially in Figs. 4 and 9, the plunger 23 is cast with a hollow interior, the rear wall of the plunger closing the interior hollow portion consisting of a steel plate or the like 110. The bottom wall of the plunger 111 is provided with passages 112 and 113 through which a fluid may be circulated to maintain the charge at the required temperature. As the plunger must be moved whenever the machine is charged, and as it is, of course, inexpedient to break the fluid connections thereto at such times, I propose connecting the source of fluid supply with the passages 112 and 113 by a telescopic connection, so as to avoid the use of flexible tubing or the like, which is usually of a relatively short life, and at the same time maintain the fluid connection at all times.

To this end, tubular members 114 and 115 are mounted in the hollow portion of the plunger and have their lower ends threaded into passages 116 and 117 which communicate with the passages 112 and 113. The upper ends of these tubes are threaded into bushings 118 and 119, through which slidably pass the pipes 120 and 121, suitably connected at their upper ends by the pipes 122 and 123 to a source of fluid supply. The pipes 120 and 121 pass loosely through the tubes 114 and 115 and also through the bushings 118 and 119 and are surrounded by suitable packing 124 at the upper ends of the bushing to avoid leakage. It will be seen, therefore, that these pipes having as they do a telescopic connection with tubes 114 and 115, are at all times in communication with the passages 112 and 113, regardless of the position of the plunger and at the same time the use of rubber tubing or other flexible connections is avoided.

As shown more especially in Figs. 4, 5 and 6, the outer walls of the plunger are slightly spaced from the inner walls of the charging stack 22, the plunger being provided at each corner adjacent its upper end with a guiding lug 125, which lugs have a bearing on both sides of the corners of the charging stack and properly guide the plunger in its movement. At its lower end, the plunger is provided at its front and back surface with scraper plates 126 and 127 and on its side surface with curved scraper plates 128 and 129 which follow the outline of the lower surface of the plunger. These scraper plates fit fairly closely against the inner walls of the charging stack so as to keep these walls clean and prevent the collecting thereon of the material of the charge, which enters through the hopper 25 and at the same time serve as lower bearing members for the plunger so as to prevent side play of the latter in the charging stack in cooperation with the lugs 125.

The electrical control circuit for motor 84 is shown diagrammatically in Fig. 14 wherein the main source of current is represented by the wires 131 and 132 from which current flows to the motor through a wire 133 leading to the starting switches 134 and 135 from whence it passes through wires 136 and 137 to one pole of each of the stop switches 90 and 91, the other poles of which are connected to the source 132 by the wire 138. From the stop switches the current passes through the wires 139 and 140 to the motor. An overload release 141 may be placed adjacent the motor to cut off the current and stop the motor in case the switches 90 or 91 should for any reason fail to operate. A safety cut-out switch 142 may be provided in the line wire 133 whereby the current can be cut off quickly from the motor in case of an emergency.

It will be apparent that as the lead wires 133 and 138 are connected with opposite poles of the switches 90 and 91 that the current from these wires will, if passing through the switch 90, be passed through the motor in a direction opposite to its direction when passing through the switch 91. These switches are, therefore, reversing switches so that the motor will be operated in the proper direction to move the plunger either upwardly or downwardly.

The switches 134 and 135 consist of starting switches 143 and 144 and coil control switches 145 and 146. The operator, for instance, may start the motor by pressing upon the switch 143 to cause it to bridge the terminals of the two poles adjacent thereto. This starts the motor and causes current to pass through the coil 147 which draws the switch member 145 downwardly to cause it to complete the circuit across the wire terminals adjacent thereto. The switch 143, which is preferably of spring press button type, may then be released and the current will be maintained in close position by the switch 145. As shown in Fig. 1, the switch buttons 143 and 144 may be mounted at the side of the stack upon a switch base 150 so as to be conveniently accessible to the operator.

The operation of the plunger actuating mechanism will be obvious from the preceding description but may be briefly set forth as follows:

As shown in Figs. 4 and 8, the plunger is in its lowermost position wherein the stop-pin 85 has engaged the end 106 of the lower bell crank lever to cause the link 97 to move the switch arm 93 so as to open the switch 91, as shown in the diagrammatic view of Fig. 14. The switch 90 within the switch box 88, adjacent the upper end of the stack, is at this time closed under tension of the spring 100, which spring closes this switch as soon as the plunger leaves the uppermost position and the pin 85 is disengaged from the finger 104 of the upper bell crank lever. As the switch 91 is opened, no current is passing through the wire 137 or coil 148 and hence the switch 146 is open under tension of a suitable spring which maintains it in open position except when drawn downwardly by the coil 148. The push button switch 144 is likewise open. The switch mechanisms 143 and 145 are likewise in open position, although as heretofore explained, the switch 90 is closed. The plunger occupies its lowermost position when a charge is being treated within the chamber of the machine and after this treatment has been completed and the batch discharged, it is necessary to raise the plunger to re-charge the machine. The operator, to this end, closes the switch 143 which causes current to pass through the wires 136 and 138 and the closed switch 90 to the motor which starts in the proper direction to raise the plunger. At the same time the coil 147 is excited, thus causing the closing of the switch 145 so that the operator may immediately release the switch 143 without interrupting the operation of the motor.

The motor shaft, as previously described, is provided with a pinion 82, meshing with a gear 81 on the shaft 78 which carries a worm 77 driving the worm wheel 72, which by its threaded connection with the shaft 70, causes this shaft to move the crosshead 37 upwardly and likewise the plunger 23. As soon as the plunger reaches the upper limit of its movement, the pin 85 strikes against the finger 104 on the arm 102 of bell crank lever, thus causing the switch arm to be thrown to the left, as shown in dotted line position in Fig. 8 and opens the switch 90. This checks the operation of the motor and the plunger is maintained in its upper position while the machine is charged.

It will be apparent that when the operator has once pressed the button 143 and set the motor in operation, he need give no further attention to its action for it will be automatically cut out when the plunger reaches the proper position. It will also be apparent that when the switch 90 is automatically opened, the switch 145 will likewise be opened, so that although the switch 90 will be automatically closed when the plunger begins to descend, no current will pass through it to the motor until the operator again presses the button 143.

With the plunger in its uppermost position, the switch 91 is closed and it may be lowered by reversing the motor, which operation is accomplished by pressure on the push button 144, as may be readily understood from Fig. 14 and the foregoing description.

I do not claim broadly herein a rubber treating machine having a mixing chamber provided with a charging opening, a stack communicating with said opening, a plunger mounted for up and down movements in the stack, and a plunger operating member connected to said plunger, said operating member being disposed in parallel spaced relation to the plunger, or other features claimed in my application, Serial No. 14,451, filed March 10, 1925; nor do I claim broadly herein a rubber mixing machine comprising a rotary bladed mixing element, a mixing chamber enclosing said element and having a feed opening at the top and a discharge opening at the bottom, a movable material-controlling and material-engaging member cooperating with one of said openings, power operated means to move said member rectilinearly, means to initiate such movement, and automatically acting controlling means controlled by the position of said member to arrest its movement at a predetermined point, as claimed in my application, Serial No. 109,650, filed of even date herewith.

While I have shown and described a preferred embodiment of my invention, it is understood that it is not to be limited to all of the details shown, but is capable of modification and variation within the spirit of the invention and within the scope of the appended claims.

What I claim is:

1. A rubber treating machine having a mixing chamber provided with a charging opening, a stack communicating with said opening, a plunger mounted to reciprocate in said stack, and means mounted alongside said stack adapted to move the plunger in the stack, said means being adapted to lock the plunger against movement by the action of the material being worked in the chamber thereon.

2. A rubber treating machine, comprising a mixing chamber having interior rotary mixing blades, a charging stack communicating with said chamber, a material forcing follower mounted for up and down movement in said stack, power means for moving said follower in said stack, and means for arresting the travel of the follower when the latter reaches a predetermined position, said means comprising a power cut-off device mounted on the stack wall, said device having a part thereof extending through the stack wall to be engaged by the plunger during its travel.

3. A rubber treating machine, comprising a mixing chamber having interior rotary mixing blades, a charging stack communicating with said chamber, a material forcing follower mounted for up and down movement in said stack, power means for moving said follower in said stack, and means for arresting the travel of the follower when the latter reaches a predetermined position, comprising a power cut-off device mounted on the stack wall, said device including a lever pivotally mounted on the stack wall and having an arm thereof extending through the stack wall into the path of the plunger to be operated thereby.

4. A rubber treating machine comprising a chamber having a charging opening, a stack communicating therewith, and a plunger mounted to reciprocate in said stack, said plunger being provided with walls adjacent the upper and lower ends thereof, the lower wall being provided with fluid chambers, a tubular member having one end mounted in the lower wall and communicating with said chambers and the other end mounted in the upper wall, and a second tubular member connected to a source of fluid supply and having a telescopic connection with said first-named tubular member.

5. A rubber treating machine comprising a chamber having a charging opening, a stack communicating therewith, and a plunger mounted to reciprocate in said stack, said plunger being provided with walls adjacent the upper and lower ends thereof, the lower wall being provided with fluid chambers, a tubular member having one end mounted in the lower wall and communicating with said chambers, and the other end mounted in the upper wall, a bracket mounted near the upper end of the stack and a second tubular member mounted in said bracket and having a telescopic connection with the first-named tubular member.

6. A rubber treating machine having a mixing chamber provided with a charging opening, a stack communicating with said opening, a plunger mounted for up and down movement in said stack, and means carried on said stack adapted to move said plunger up and down by power, said means including a shaft mounted for reciprocation parallel to said plunger at one side thereof and connected thereto.

7. A rubber treating machine comprising a mixing chamber having interior rotary mixing blades, a charging stack communicating with said chamber, a material-forcing follower mounted in said stack for up and down movement, means for initiating travel of said follower in the stack in either direction, and means for arresting the travel of the follower automatically when a predetermined limit of travel in each direction is reached, said means including cut-off devices mounted on the stack exteriorly thereof, but having parts projecting into the stack to engage the follower.

8. A rubber treating machine having a mixing chamber provided with a charging opening, a stack communicating with said opening, a plunger mounted to reciprocate in said stack, and means including an elongated actuating member alongside and adapted to move parallel to and in the same direction as said plunger to move the latter in the stack.

9. A rubber treating machine, having a mixing chamber provided with a charging opening, a stack communicating with said opening, and a plunger mounted for up and down movements in said stack, a plunger operating member mounted on said stack for up and down movements parallel to the plunger, and means flexibly connecting said plunger to said operating member for movement therewith.

10. A rubber treating machine, having a mixing chamber provided with a charging opening, a stack communicating with said opening, and a plunger mounted for up and down movements in said stack, a plunger operating member mounted for up and down movements adjacent the plunger, and means connecting said plunger to said operating member for movement therewith, and electrically operated means for moving said plunger operating member.

11. A rubber treating machine, having a mixing chamber provided with a charging opening, a stack communicating with said opening, and a plunger mounted for up and down movements in said stack, a cross-head connected to the plunger and guided for movement therewith, and a plunger operating member connected with said cross-head and extending in parallel relation with said plunger.

12. A rubber treating machine, having a mixing chamber provided with a charging opening, a stack communicating with said opening, and a plunger mounted for up and down movements in said stack, a cross-head connected to the plunger and guided for movement therewith, and a plunger operating member connected with said cross-head and extending in parallel relation with said plunger, and electrically operated means to move said member.

13. A rubber treating machine, having a chamber provided with a charging opening and a stack communicating therewith, a plunger mounted for up and down movements in the stack, a cross-head connected to the upper end of the plunger and guided for movement therewith, a plunger operating member connected to said cross-head and extending downwardly therefrom in parallel spaced relation with said plunger, and means for moving said plunger operating member.

14. A rubber treating machine, having a chamber provided with a charging opening and a stack communicating therewith, a plunger mounted for up and down movements in the stack, a cross-head connected to the upper end of the plunger and guided for movement therewith, a plunger operating member connected to said cross-head and extending downwardly therefrom in parallel spaced relation with said plunger, and means for moving said plunger operating member comprising a member rotatably mounted on the stack and having threaded engagement with the plunger operating member, and electrical means for rotating said rotatably mounted member.

15. A rubber treating machine comprising a chamber having a charging opening, a stack communicating therewith, and a plunger mounted to reciprocate in said stack, a cross-head flexibly secured to said plunger and guided for movement therewith, a threaded shaft secured to said cross-head, a sleeve having threaded engagement with said shaft, a worm wheel secured to said sleeve, and means for operating said worm wheel.

16. A rubber treating machine comprising a chamber having a charging opening, a stack communicating therewith, and a plunger mounted to reciprocate in said stack, a cross-head secured to said plunger and guided for movement therewith, a threaded shaft secured to said cross-head, a sleeve having threaded engagement with said shaft, and electrically operated means for rotating said sleeve comprising a motor, and reducing gearing between said motor and sleeve.

17. A rubber treating machine comprising a chamber having a charging opening, a stack communicating therewith, and a plunger mounted to reciprocate in said stack, and scraper plates mounted on said plunger to clear material from the wall of the stack.

18. A rubber treating machine comprising a chamber having a charging opening, a stack communicating therewith, and a plunger mounted to reciprocate in said stack, and scraper plates mounted on all sides of the lower end of the plunger to engage the walls of the stack during the movements of the plunger.

19. A rubber treating machine comprising a chamber having a charging opening, a stack communicating therewith, and a plunger mounted to reciprocate in said stack, the body of said plunger having a smaller cross-section than that of the stack, and means projecting from each side of the plunger at the upper and lower edges thereof to engage the wall of the stack and guide the plunger in its movements, the means at the lower end of the plunger constituting scraper members to clear the walls of the stack on the downward movement of the plunger.

20. A rubber mixing machine having a mixing chamber, a charging stack co-operating therewith, and a plunger slidably mounted in the stack, a casing adjacent the stack, a crosshead mounted in said casing and connected to the plunger and means for guiding the crosshead in its movements comprising shoes connected to the crosshead and having relatively long bearing surfaces against the wall of the casing.

21. A rubber mixing machine having a mixing chamber, a charging stack co-operating therewith, and a plunger slidably mounted in the stack, a casing adjacent the stack, a crosshead mounted in said casing and connected to the plunger and means for guiding the crosshead in its movements comprising shoes pivotally connected to the crosshead, and having relatively long bearing surfaces against the wall of the casing.

22. A rubber mixing machine having a chamber, a charging stack connecting therewith, a plunger reciprocally mounted in the stack, a casing mounted adjacent the stack, a crosshead slidably mounted in the casing and connected to the plunger, a pin secured to the crosshead and projecting at each side thereof and bearing shoes pivotally carried by said pin and bearing against the walls of the casing to guide the crosshead in its movement.

23. A rubber treating machine having a mixing chamber provided with an opening, a movable closure member cooperating with said opening, an operating member for said closure member, said operating member being mounted on said machine alongside said closure member for parallel movement therewith, and a flexible connection between said closure member and said operating member.

24. A rubber treating machine having a mixing chamber provided with an opening, a movable closure member cooperating with said opening, power operated means for moving said closure member, said power operated means being mounted for parallel movement relative to said closure member and a flexible connection between the closure member and said power operated means.

25. A rubber treating machine having a mixing chamber provided with an opening, a closure member cooperating with said opening, operating means for said closure member disposed in parallel relation thereto and including a rod carried in said operating means having a flexible connection with said closure member.

26. A rubber treating machine having a mixing chamber provided with an opening, a closure member cooperating with said opening, power operated means for moving said member to closed position mounted in parallel relation to said closure member and including a self-locking connection to retain the closure member in place against opposition.

27. A rubber treating machine having a mixing chamber provided with a charging opening, a stack communicating with said opening, a plunger mounted to reciprocate in said stack, and means carried on a side wall of said stack adapted to reciprocate said plunger, said means including a motor and connections between said motor and said plunger, said connections including a part movable with the plunger and extending laterally through the side wall of the stack and connected to said motor.

28. A rubber treating machine comprising a mixing chamber having interior rotary mixing blades, a charging stack communicating with said chamber, a material-forcing follower mounted in said stack for up and down movement, means for initiating travel of said follower in the stack in either direction, and means for arresting the travel of the follower automatically when a predetermined limit of travel in each direction is reached, said means including cut-off devices mounted on the stack exteriorly thereof, but having parts projecting into the stack to engage the follower.

29. A rubber treating machine having a mixing chamber provided with a charging opening, a stack communicating with said opening, a plunger mounted to move upwardly and downwardly in said stack, and means including an elongated electric-motor-driven longitudinally moving shaft alongside and adapted to move parallel to and in the same direction as said plunger to move the plunger vertically.

30. A rubber treating machine having a mixing chamber provided with a charging opening, a stack communicating with said opening, a plunger mounted to reciprocate in said stack, and means carried on a side wall of said stack adapted to move parallel to and in the same direction as said plunger to reciprocate the latter.

31. A rubber treating machine, having a mixing chamber provided with a charging opening, a stack communicating with said opening, a plunger mounted to reciprocate in said stack, and means carried on a side wall of said stack adapted to move parallel to and in the same direction as said plunger to reciprocate the latter, said means including a shaft connected at its upper end to the upper end of the plunger, said shaft extending downwardly parallel to the plunger, and means for reciprocating the shaft.

32. A rubber treating machine having a mixing chamber provided with a charging opening, a stack communicating with said opening, a plunger mounted to reciprocate in said stack, means carried on said stack adapted to reciprocate said plunger, said means including a plunger operating member, and means flexibly connecting said operating member to said plunger.

33. A rubber treating machine having a mixing chamber provided with a charging opening, a stack communicating with said opening, a plunger mounted for up and down movements in said stack, means carried on said stack adapted to reciprocate said plunger, said means including a shaft mounted for reciprocation parallel to said plunger, a cross-head on one end of said shaft, a connection between said cross-head and said plunger, a guideway for said cross-head, and means for reciprocating said shaft.

34. A rubber treating machine having a mixing chamber provided with a charging opening, a stack communicating with said opening, a plunger mounted for up and down movements in said stack, means carried on said stack adapted to reciprocate said plunger, said means including a shaft mounted for reciprocation parallel to said plunger, a cross-head on the upper end of said shaft, a connection between said cross-head and the upper end of said plunger, a guideway for said cross-head, and means for reciprocating said shaft.

35. A rubber treating machine having a mixing chamber provided with a charging opening, a stack communicating with said opening, a plunger mounted for up and down movements in said stack, means carried on said stack adapted to reciprocate said plunger, said means including a threaded shaft mounted for reciprocation parallel to said plunger, a cross-head at one end of said shaft, a connection between said cross-head and plunger, and a threaded nut carried on said stack and having said shaft received therein, said nut being adapted through rotation thereof to reciprocate said shaft.

36. A rubber treating machine comprising a chamber having a charging opening, a stack communicating therewith, a plunger mounted to reciprocate in said stack, chambers provided in the lower end of the plunger for controlling the temperature thereof, means for making a fluid connection with said chambers comprising a pipe secured in said plunger adjacent one of the fluid passages, and in fluid connection therewith, means for supporting said pipe on the opposite end of said plunger from said fluid passages, a second pipe telescopically received within said first mentioned pipe, and a bracket carried on said stack, said telescopically received pipe being supported on said bracket.

In witness whereof, I have hereunto set my hand this 4th day of May, 1926.

RICHARD C. LEWIS.